(12) United States Patent
Naito

(10) Patent No.: US 12,194,450 B2
(45) Date of Patent: Jan. 14, 2025

(54) METHOD FOR PRODUCING HONEYCOMB STRUCTURE AND METHOD FOR PRODUCING ELECTRICALLY HEATING SUPPORT

(71) Applicant: NGK INSULATORS, LTD., Nagoya (JP)

(72) Inventor: Yuto Naito, Hashima-Gun (JP)

(73) Assignee: NGK INSULATORS, LTD., Nagoya (JP)

( * ) Notice: Subject to any disclaimer, the term of this patent is extended or adjusted under 35 U.S.C. 154(b) by 91 days.

(21) Appl. No.: 17/643,220

(22) Filed: Dec. 8, 2021

(65) Prior Publication Data

US 2022/0297104 A1     Sep. 22, 2022

(30) Foreign Application Priority Data

Mar. 16, 2021     (JP) .................................. 2021-042748

(51) Int. Cl.
*C04B 38/00* (2006.01)
*B01J 35/56* (2024.01)
(Continued)

(52) U.S. Cl.
CPC .............. *B01J 35/56* (2024.01); *B01J 37/08* (2013.01); *B28B 11/12* (2013.01);
(Continued)

(58) Field of Classification Search
CPC .................. C03B 38/0006–0019; B28B 11/12
See application file for complete search history.

(56) References Cited

U.S. PATENT DOCUMENTS 5,800,787 A      9/1998   Kato et al.
2010/0135873 A1*  6/2010   Sutherland .......... C04B 38/0009
                                                              264/138
(Continued)

FOREIGN PATENT DOCUMENTS

EP     2 233 194 A1    9/2010
EP     2 236 481 A2   10/2010
(Continued)

OTHER PUBLICATIONS

Chinese Office Action (Application No. 202111490914.7) dated Jan. 20, 2023 (with English translation).
(Continued)

*Primary Examiner* — Erin Snelting
(74) *Attorney, Agent, or Firm* — BURR PATENT LAW, PLLC

(57) ABSTRACT

A method for producing a ceramic honeycomb structure, the honeycomb structure includes: an outer peripheral wall; and partition walls disposed on an inner side of the outer peripheral wall, the partition walls defining a plurality of cells, each of the cells extending from one end face to the other end face to form a flow path, wherein the honeycomb structure includes at least one slit provided on a cross section perpendicular to an axial direction of the honeycomb structure, wherein the method includes the steps of: preparing a honeycomb structure element before forming the slit; and forming the slit by arranging a wire so as to pass from one end face to the other end face in the cell and then cutting the partition walls while moving the honeycomb structure element and/or the wire.

6 Claims, 8 Drawing Sheets

(51) Int. Cl.
  *B01J 37/08* (2006.01)
  *B28B 11/12* (2006.01)
  *H05B 3/00* (2006.01)
  *C04B 38/06* (2006.01)
  *C04B 38/08* (2006.01)

(52) U.S. Cl.
  CPC ....... *C04B 38/0006* (2013.01); *H05B 3/0004* (2013.01); *C04B 38/0645* (2013.01); *C04B 38/067* (2013.01); *C04B 38/068* (2013.01); *C04B 38/08* (2013.01); *H05B 2203/016* (2013.01); *H05B 2203/017* (2013.01)

(56) References Cited

U.S. PATENT DOCUMENTS

| | | |
|---|---|---|
| 2014/0291315 A1 | 10/2014 | Mase et al. |
| 2014/0294689 A1 | 10/2014 | Mase et al. |
| 2015/0000486 A1* | 1/2015 | Mori ................ B28D 1/086 83/37 |
| 2020/0114537 A1 | 4/2020 | Kusano et al. |

FOREIGN PATENT DOCUMENTS

| | | |
|---|---|---|
| JP | H07-008803 A | 1/1995 |
| JP | H08-273805 A | 10/1996 |
| JP | H11-297342 A | 10/1999 |
| JP | 2010-221575 A | 10/2010 |
| JP | 2014-198296 A | 10/2014 |
| JP | 2014-198305 A | 10/2014 |
| JP | 2018-164899 A | 10/2018 |

OTHER PUBLICATIONS

Japanese Office Action (with English translation) dated Jun. 20, 2024 (Application No. 2021-042748).
German Office Action (with English translation) dated Feb. 15, 2024 (Application No. 10 2021 214 903.0).

* cited by examiner

METHOD FOR PRODUCING HONEYCOMB STRUCTURE AND METHOD FOR PRODUCING ELECTRICALLY HEATING SUPPORT

FIELD OF THE INVENTION

The present invention relates to a method for producing a honeycomb structure, and a method for producing an electrically heating support.

BACKGROUND OF THE INVENTION

Recently, electrically heated catalysts (EHCs) have been proposed to improve a decrease in exhaust gas purification performance immediately after engine starting. For example, the EHC is configured to connect metal electrodes to a pillar shaped honeycomb structure made of conductive ceramics, and conducting a current to heat the honeycomb structure itself, thereby enabling a temperature to be increased to an activation temperature of the catalyst prior to the engine starting.

The EHC preferably has a structure including good thermal shock resistance that is resistant to cracking in response to changes in exhaust gas temperatures in order not to interrupt a current flow path of the honeycomb structure and to prevent the honeycomb structure from falling out.

Patent Literature 1 discloses a technique for improving thermal shock resistance by providing slits on an outer peripheral wall and electrode portions of a honeycomb structure.

Patent Literature 2 discloses a technique for preventing cell breakage of a honeycomb body by removing a part of partition walls of the honeycomb structure to form slits that connect the cells, thereby reducing the stress generated by current concentration.

CITATION LIST

Patent Literatures

[Patent Literature 1] Japanese Patent Application Publication No. 2014-198296 A
[Patent Literature 2] Japanese Patent Application Publication No. H08-273805 A

SUMMARY OF THE INVENTION

For the formation of a slit(s) perpendicular to an axial direction inside the honeycomb structure, conventionally, only the targeted partition wall cannot be easily removed, and adjacent partition walls that are not planned to be removed may also be removed inside the honeycomb structure, and therefore there is still room for improvement. Further, even if the slit(s) perpendicular to the axial direction is/are formed inside the honeycomb structure, there is a problem in terms of processing accuracy.

The present invention has been made in light of the above circumstances. An object of the present invention is to provide a method for producing a honeycomb structure and a method for producing an electrically heating support, which can form at least one slit perpendicular to an axial direction inside the honeycomb structure with good accuracy.

The above problem is solved by the following present invention, and the present invention is specified as follows:

(1) A method for producing a ceramic honeycomb structure, the honeycomb structure comprising: an outer peripheral wall; and partition walls disposed on an inner side of the outer peripheral wall, the partition walls defining a plurality of cells, each of the cells extending from one end face to the other end face to form a flow path, wherein the honeycomb structure comprises at least one slit provided on a cross section perpendicular to an axial direction of the honeycomb structure,
wherein the method comprises the steps of:
preparing a honeycomb structure element before forming the slit; and
forming the slit by arranging a wire so as to pass from one end face to the other end face in the cell and then cutting the partition walls while moving the honeycomb structure element and/or the wire.

(2) A method for producing a ceramic honeycomb structure, the honeycomb structure comprising: an outer peripheral wall; and partition walls disposed on an inner side of the outer peripheral wall, the partition walls defining a plurality of cells, each of the cells extending from one end face to the other end face to form a flow path, wherein the honeycomb structure comprises at least one slit provided on a cross section perpendicular to an axial direction of the honeycomb structure,
wherein the method comprises the steps of:
preparing a honeycomb structure element before forming the slit; and
forming the slit by applying ultrasonic vibration to a cutting tool to cut the partition walls from one end face to the other end face of the honeycomb structure element.

(3) The method for producing the honeycomb structure according to (1) or (2), further comprising a step of forming a pair of electrode portions on an outer surface of the outer peripheral wall so as to extend in a band shape in a flow path direction of the cells across the central axis of the honeycomb structure.

(4) A method for producing an electrically heating support, the method comprising a step of electrically connecting a metal electrode to each of the pair of electrode portions of the honeycomb structure produced by the method according to (3).

According to the present invention, it is possible to provide a method for producing a honeycomb structure and a method for producing an electrically heating support, which can form at least one slit perpendicular to an axial direction inside the honeycomb structure with good accuracy.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be made based on ordinary knowledge of a person skilled in the art, without departing from the spirit of the present invention.

<1. Honeycomb Structure>

Figure 1:
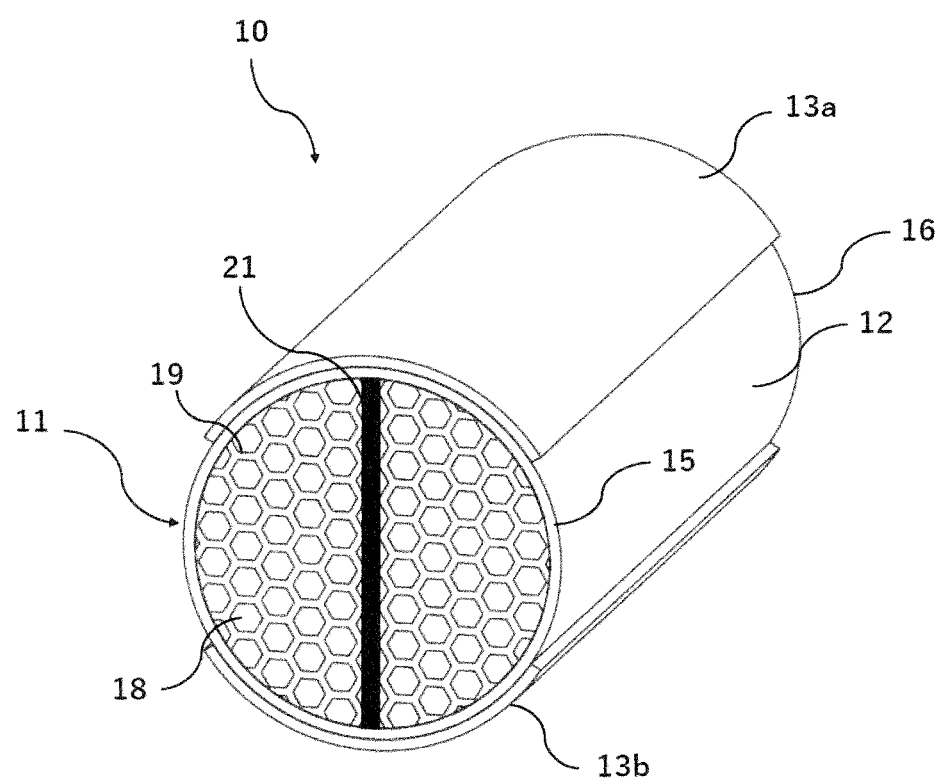
FIG. 1 is a schematic external view of a honeycomb structure according to an embodiment of the present invention.

FIG. 1 is a schematic external view of a honeycomb structure 10 according to an embodiment of the present invention. The honeycomb structure 10 includes a honeycomb structure portion 11 and electrode portions 13a, 13b. The honeycomb structure 10 may not include the electrode portions 13a, 13b.

(1-1. Honeycomb Structure Portion)

The honeycomb structure partition 11 is a pillar shaped member made of ceramics, and includes: an outer peripheral wall 12; and partition walls 19 which are disposed on an inner side of the outer peripheral wall 12 and define a plurality of cells 18 each extending from one end face 15 to the other end face 16 to form a flow path. The word "pillar shaped" is understandable as a three-dimensional shape having a thickness in an extending direction of the cells 18 (an axial direction of the honeycomb structure). A ratio of the axial length of the honeycomb structure to the diameter or width of each end face of the honeycomb structure (an aspect ratio) is arbitrary. The pillar shape may also include a shape in which the axial length of the honeycomb structure is shorter than the diameter or width of each end face (flat shape).

An outer shape of the honeycomb structure portion 11 is not particularly limited as long as it is pillar shaped. For example, the honeycomb structure portion can have a shape such as a pillar shape with circular end faces (cylindrical shape), a pillar shape with oval end faces and a pillar shape with polygonal (quadrangular, pentagonal, hexagonal, heptagonal, octagonal, etc.) end faces. The size of the honeycomb structure portion 11 is such that an area of the end faces is preferably from 2000 to 20000 $mm^2$, and more preferably from 5000 to 15000 $mm^2$, for the purpose of improving heat resistance (suppressing cracks entering the outer peripheral wall in a circumferential direction).

The honeycomb structure portion 11 is made of a material selected from the group consisting of oxide ceramics such as alumina, mullite, zirconia and cordierite, and non-oxide ceramics such as silicon carbide, silicon nitride and aluminum nitride, although not limited thereto. Silicon carbide-metal silicon composite materials and silicon carbide/graphite composite materials may also be used. Among them, the material of the honeycomb structure portion 11 preferably contains ceramics mainly based on the silicon-silicon carbide composite material or on silicon carbide, in terms of achieving both heat resistant and electrical conductivity. The phrase "the honeycomb structure portion 11 is mainly based on a silicone-silicon carbide composite material" as used herein means that the honeycomb structure portion 11 contains 90% by mass or more of the silicon-silicon carbide composite material (total mass) based on the entire honeycomb structure portion. Here, the silicon-silicon carbide composite material contains silicon carbide particles as an aggregate and silicon as a bonding material for bonding the silicon carbide particles, and a plurality of silicon carbide particles are bonded by silicon so as to form pores between the silicon carbide particles. The phrase "the honeycomb structure portion 11 is mainly based on silicon carbide" as used herein means that the honeycomb structure portion 11 contains 90% by mass or more of the silicon carbide (total mass) based on the entire honeycomb structure portion.

When the honeycomb structure portion 11 contains the silicon-silicon carbide composite material, a ratio of a "mass of silicon as a bonding material" contained in the honeycomb structure portion 11 to the total of a "mass of silicon carbide particles as an aggregate" contained in the honeycomb structure portion 11 and a "mass of silicon as a bonding material" contained in the honeycomb structure portion 11 is preferably from 10 to 40% by mass, and more preferably from 15 to 35% by mass.

A shape of each cell in a cross section perpendicular to an extending direction of the cells 18 is not limited, but it is preferably a quadrangle, a hexagon, an octagon, or a combination thereof. Among these, the quadrangle and the hexagon are preferred, in terms of easily achieving both structural strength and heating uniformity.

Each of the partition walls 19 defining the cells 18 preferably has a thickness of from 0.1 to 0.3 mm, and more preferably from 0.1 to 0.2 mm. As used herein. the thickness of the partition wall 19 is defined as a length of a portion passing through the partition walls 19, among line segments connecting centers of gravity of the adjacent cells 18 in the cross section perpendicular to the extending direction of the cells 18.

The honeycomb structure portion 11 preferably has a cell density of from 40 to 150 $cells/cm^2$, and more preferably from 70 to 100 $cells/cm^2$, in the cross section perpendicular to the flow path direction of the cells 18. The cell density in such a range can increase the purification performance of the catalyst while reducing the pressure loss upon flowing of an exhaust gas. The cell density is a value obtained by dividing the number of cells by an area of one end face of the honeycomb structure portion 11 excluding the outer peripheral wall 12 portion.

The provision of the outer peripheral wall 12 of the honeycomb structure portion 11 is useful in terms of ensuring the structural strength of the honeycomb structure portion 11 and preventing a fluid flowing through the cells 18 from leaking from the outer peripheral wall 12. More particularly, the thickness of the outer peripheral wall 12 is preferably 0.05 mm or more, and more preferably 0.1 mm or more, and even more preferably 0.15 mm or more. However, if the outer peripheral wall 12 is too thick, the strength becomes too high, so that a strength balance between the outer peripheral wall 12 and the partition wall 19 is lost to reduce thermal shock resistance, and if the thickness of the outer peripheral wall 12 is excessively increased, the heat capacity increases and a temperature difference between the outer peripheral side and the inner peripheral side of the outer peripheral wall 12 increases, so that the heat impact resistance decreases. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in the cross section perpendicular to the extending direction of the cells.

The partition walls 19 of the honeycomb structure portion 11 preferably have an average pore diameter of from 2 to 15 μm, and more preferably from 4 to 8 μm. The average pore diameter is a value measured by a mercury porosimeter.

The partition walls 19 may be porous. When the partition walls 19 are porous, the partition wall 19 preferably has a porosity of from 35 to 60%, and more preferably from 35 to 45%. The porosity is a value measured by a mercury porosimeter.

The honeycomb structure 10 is made of ceramics, and preferably has electrical conductivity. Volume resistivity of the honeycomb structure 10 is not particularly limited as long as the honeycomb structure 10 can generate heat by Joule heat upon electrical conduction. The volume resistivity is preferably from 0.1 to 200 Ωcm, and more preferably from 1 to 200 Ωcm. As used herein, the volume resistivity of the honeycomb structure 10 is a value measured at 400° C. by a four-terminal method.

(1-2. Electrode Portion)

The honeycomb structure 10 includes a pair of electrode portions 13a, 13b on an outer surface of the outer peripheral wall 12 across a central axis of the honeycomb structure portion 11 so as to extend in the form of a band in the flow path direction of the cells 18. By thus providing the pair of electrode portion 13a, 13b, uniform heat generation of the honeycomb structure 10 can be enhanced. It is desirable that each of the electrode portions 13a, 13b extends over a length of 80% or more, and preferably 90% or more, and more preferably the full length, between both end faces of the honeycomb structure 10, from the viewpoint that a current easily spreads in an axial direction of each of the electrode portions 13a, 13b.

Each of the electrode portions 13a, 13b preferably has a thickness of from 0.01 to 5 mm, and more preferably from 0.01 to 3 mm. Such a range can allow uniform heat generation to be enhanced. The thickness of each of the electrode portions 13a, 13b is defined as a thickness in a direction of a normal line to a tangential line at a measurement point on an outer surface of each of the electrode portions 13a, 13b when observing the point of each electrode portion to be subjected to thickness measurement in the cross section perpendicular to the extending direction of the cells.

The volume resistivity of each of the electrode portions 13a, 13b is lower than the volume resistivity of the honeycomb structure portion 11, whereby the electricity tends to flow preferentially to the electrode portions 13a, 13b, and the electricity tends to spread in the flow path direction and the circumferential direction of the cells 18 during electric conduction. The volume resistivity of the electrode portions 13a, 13b is preferably $\frac{1}{10}$ or less, and more preferably $\frac{1}{20}$ or less, and even more preferably $\frac{1}{30}$ or less, of the volume resistivity of the honeycomb structure portion 11. However, if the difference in volume resistivity between both becomes too large, the current is concentrated between ends of the opposing electrode portions to bias the heat generated in the honeycomb structure portion 11. Therefore, the volume resistivity of the electrode portions 13a, 13b is preferably $\frac{1}{200}$ or more, and more preferably $\frac{1}{150}$ or more, and even more preferably $\frac{1}{100}$ or more, of the volume resistivity of the honeycomb structure portion 11. As used herein, the volume resistivity of the electrode portions 13a, 13b is a value measured at 25° C. by a four-terminal method.

Each of the electrode portions 13a, 13b may be made of conductive ceramics, a metal, and a composite of a metal and conductive ceramics (cermet). Examples of the metal include a single metal of Cr, Fe, Co, Ni, Si or Ti, or an alloy containing at least one metal selected from the group consisting of those metals. Non-limiting examples of the conductive ceramics include silicon carbide (SiC), metal compounds such as metal silicides such as tantalum silicide ($TaSi_2$) and chromium silicide ($CrSi_2$). Specific examples of the composite of the metal and the conductive ceramics (cermet) include a composite of metal silicon and silicon carbide, a composite of metal silicide such as tantalum silicide and chromium silicide, metal silicon and silicon carbide, and further a composite obtained by adding to one or more metals listed above one or more insulating ceramics such as alumina, mullite, zirconia, cordierite, silicon nitride, and aluminum nitride, in terms of decreased thermal expansion.

(1-3) Slit

In the cross section perpendicular to the axial direction of the honeycomb structure 10, at least one slit 21 is provided. The slit 21 is formed so as to be perpendicular to the axial direction in the honeycomb structure 10, or more specifically, to penetrate from one end face to the other end face of the honeycomb structure 10. According to this configuration, when the honeycomb structure 10 generates heat, stress relaxation will function by the slit 21, so that generation of cracks due to a thermal expansion difference generated within the honeycomb structure 10 can be well suppressed.

The shape and number of slits 21 in the cross section of the honeycomb structure 10 are not particularly limited and can be designed accordingly. For example, there may be one slit 21 or two or more slits 21 in the cross section of the honeycomb structure 10, each of which may be formed so that they do not intersect with each other, or may be formed so that they at least partially intersect with each other. The length and width of each slit 21 in the cross section of the honeycomb structure 10 are not particularly limited. The width of each slit 21 in the cross section of the honeycomb structure 10 may be formed to be the same as the width of each cell 18, or the width of each slit 21 may be formed to be smaller or larger than that of each cell 18. The length of each slit 21 in the cross section of the honeycomb structure 10 is not particularly limited, but it may be from 2 to 80 cells. The width of each slit 21 is not particularly limited, but it may be 1 to 5 cells. The length and width of each slit 21 in the cross section of the honeycomb structure 10 can be designed appropriately depending on the size, material, applications, and number of slits 21 of the honeycomb structure 10.

Each slit 21 may be divided into sections along an extending direction of the slits 21 in the cross section of the honeycomb structure 10. In this case, the slit 21 may be divided into slits having the same length or different lengths in the cross section of the honeycomb structure 10. By dividing and forming the slit 21 in the cross section of the honeycomb structure 10, the generation of cracks in the honeycomb structure 10 can be well controlled. The number of slits 21 divided is not particularly limited, but each slit 21 may be divided into two, three, or four or more sections. In addition, the honeycomb structure may be provided with a plurality of slits consisting of the combination of divided slits and non-divided slits.

FIG. 1 schematically shows an embodiment where there is one slit 21 in the cross section of the honeycomb structure 10. The slit 21 may extend so as to pass through the center as shown in FIG. 1 or so as not to pass through the center in the cross section of the honeycomb structure 10. Specific examples of an embodiment where a plurality of slits 21 are formed are shown in FIG. 2(A) to FIG. 2(H). It should be noted that each of FIG. 2(A) to FIG. 2(H) only shows the outer diameter of one end face 15 of the honeycomb structure 10 and the shape of the slits 21. All of them show the morphology at one end face of the honeycomb structure 10. These slits 21 maintain a similar morphology in the cross section of the honeycomb structure 10 and are formed to extend in the axial direction and penetrate to the other end face of the honeycomb structure 10.

Figures 2A, 2B, 2C, 2D, 2E, 2F, 2G, 2H:
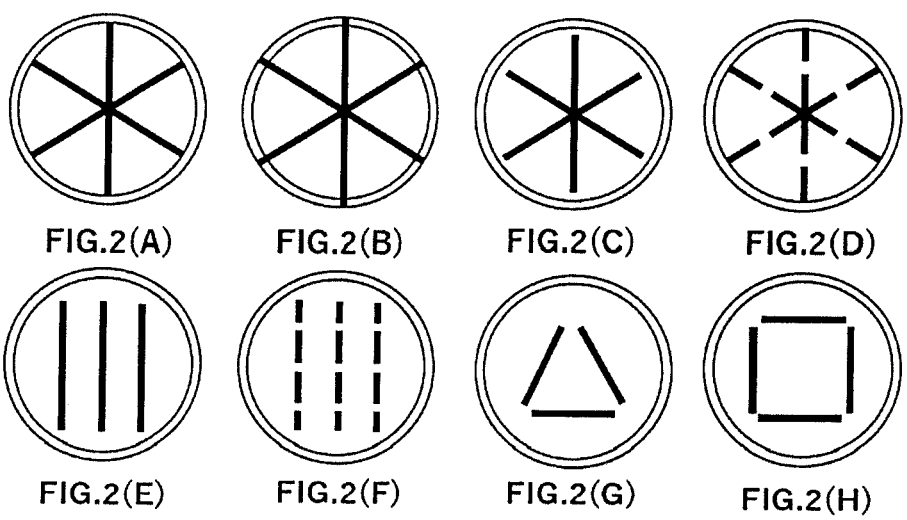
FIG. 2(A) to FIG. 2(H) are schematic views showing specific examples of shapes of slits at end faces of honeycomb structures.

As shown in FIG. 2(A), the slits 21 may be three slits that intersect with one another at the center and extend to the inner peripheral end of the outer peripheral wall on both sides, on the end face of the honeycomb structure 10. As shown in FIG. 2(B), each of the three slits shown in FIG. 2(A) may be formed to a length that reaches the outer peripheral wall.

As shown in FIG. 2(C), the slits 21 may be formed at a length where the three slits shown in FIG. 2(A) do not each reach the inner end of the outer peripheral wall on the end face of the honeycomb structure 10. Also, as shown in FIG. 2(D), each of the three slits shown in FIG. 2(A) may be divided along the extending direction.

As shown in FIG. 2(E), the slits 21 may be three slits extending parallel to one another on the end face of the honeycomb structure 10. As shown in FIG. 2(F), each of the three slits shown in FIG. 2(E) may be divided along the extending direction.

As shown in FIG. 2(G), the slits 21 may be three slits, which form a substantially triangle where the slits do not intersect at their apexes, on the end face of the honeycomb structure 10. As shown in FIG. 2(H), the slits may also be four slits, which form a substantially square where the slits do not intersect at their apexes.

The slit(s) 21 may be filled with a filling material. The filling material is preferably filled in at least a portion of a space in the slit 21. The filling material is filled in 50% or more of the space of the slit 21, and more preferably in the entire space of the slit 21.

When the honeycomb structure 10 is mainly based on silicon carbide or a metal silicon-silicon carbide composite material, the filling material preferably contains 20% by mass or more of silicon carbide, and even more preferably from 20 to 70% by mass of silicon carbide. This can allow a thermal expansion coefficient of the filling material to be close to that of the honeycomb structure 10, thereby improving the thermal shock resistance of the honeycomb structure 10. The filling material may contain 30% by mass or more of silica, alumina, or the like.

<2. Electrically Heating Support>

Figure 3:
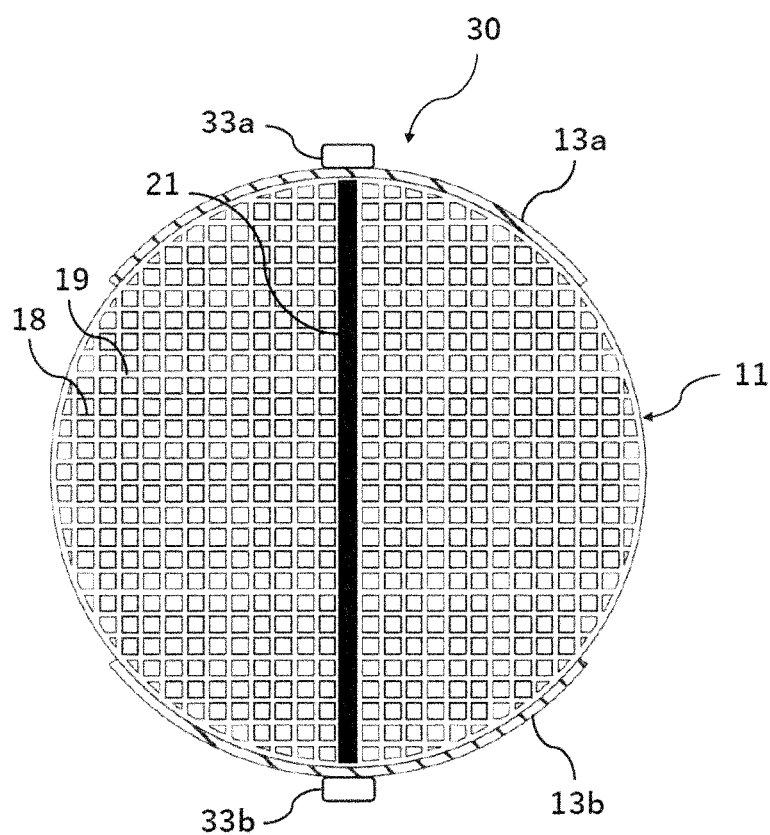
FIG. 3 is a schematic cross-sectional view of an electrically heating support according to an embodiment of the present invention, which is perpendicular to an extending of cells.

FIG. 3 is a schematic cross-sectional view of an electrically heating support 30 according to an embodiment of the present invention, which is perpendicular to the extending direction of the cells. The electrically heating support 30 includes: the honeycomb structure 10; and metal electrodes 33a, 33b electrically connected to the electrode portions 13a, 13b of the honeycomb structure 10, respectively.

(2-1. Metal Electrode)

Metal electrodes 33a, 33b are provided on the electrode portions 13a, 13b of the honeycomb structure 10. The metal electrode 33a, 33b may be a pair of metal electrode such that one metal electrode 33a is disposed so as to face the other metal electrode 33b across the central axis of the honeycomb structure portion 11. As a voltage is applied to the metal electrodes 33a, 33b through the electrode portions 13a, 13b, then the electricity is conducted through the metal electrodes 33a, 33b to allow the honeycomb structure portion 11 to generate heat by Joule heat. Therefore, the electrically heating support 30 can also be suitably used as a heater. The applied voltage is preferably from 12 to 900 V, and more preferably from 48 to 600 V, although the applied voltage may be changed as needed.

The material of the metal electrodes 33a, 33b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal electrodes 33a, 33b are not particularly limited, and they can be appropriately designed according to the size of the electrically heating support 30, the electrical conduction performance, and the like.

By supporting the catalyst on the electrically heating support 30, the electrically heating support 30 can be used as a catalyst. For example, a fluid such as an exhaust gas from a motor vehicle can flow through the flow paths of the plurality of cells 18 of the honeycomb structure 10. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a NOx storage reduction catalyst (LNT catalyst) containing an alkaline earth metal and platinum as storage components for nitrogen oxides ($NO_x$). Illustrative examples of a catalyst that does not use the noble metal include a NOx selective reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

<3. Method for Producing Honeycomb Structure>

Next, a method for producing the honeycomb structure 10 according to an embodiment of the present invention will be described.

The method for producing the honeycomb structure 10 according to an embodiment of the present invention includes: a forming step of producing a honeycomb formed body; a drying step of producing a honeycomb dried body; and a firing step of producing a honeycomb fired body.

(Forming Step)

In the forming step, first, a forming raw material containing conductive ceramics is prepared. The forming raw material is prepared by adding metal silicon powder (metal silicon), a binder, a surfactant(s), a pore former, water, and the like to silicon carbide powder (silicon carbide). It is preferable that a mass of metal silicon is from 10 to 40% by mass relative to the total of mass of silicon carbide powder and mass of metal silicon. The average particle diameter of the silicon carbide particles in the silicon carbide powder is preferably from 3 to 50 μm, and more preferably from 3 to 40 μm. The average particle diameter of the metal silicon (the metal silicon powder) is preferably from 2 to 35 μm. The average particle diameter of each of the silicon carbide particles and the metal silicon (metal silicon particles) refers to an arithmetic average diameter on volume basis when frequency distribution of the particle size is measured by the laser diffraction method. The silicon carbide particles are fine particles of silicon carbide forming the silicon carbide powder, and the metal silicon particles are fine particles of metal silicon forming the metal silicon powder. It should be noted that this is the formulation of the molding raw material in the case where the material of the honeycomb structure 10 is the silicon-silicon carbide composite material, and when the material of interest is silicon carbide, no metal silicon is added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metal silicon powder is 100 parts by mass.

The content of water is preferably from 20 to 60 parts by mass when the total mass of the silicon carbide powder and the metal silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metal silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metal silicon powder is 100 parts by mass. An average particle diameter of the pore former is preferably from 10 to 30 μm. The average particle diameter of the pore former refers to an arithmetic average diameter on volume basis when frequency distribution of the particle size is measured by the laser diffraction method. When the pore former is the water absorbing resin, the average particle diameter of the pore former refers to an average particle diameter after water absorption.

The resulting forming raw material is then kneaded to form a green body, and the green body is then extruded to prepare a honeycomb formed body. The honeycomb formed body includes: the outer peripheral wall; and the partition walls which are disposed on the inner side of the outer peripheral wall and define the plurality of cells each extending from one end face to the other end face to form the flow path.

(Drying Step)

The resulting honeycomb formed body is then dried to produce a honeycomb dried body. The drying method is not particularly limited. Examples include electromagnetic wave heating methods such as microwave heating/drying and high-frequency dielectric heating/drying, and external heating methods such as hot air drying and superheated steam drying. Among them, it is preferable to dry a certain amount of moisture by the electromagnetic wave heating method and then dry the remaining moisture by the external heating method, in terms of being able to dry the entire molded body quickly and evenly without cracking. As for conditions of drying, it is preferable to remove 30 to 99% by mass of the water content before drying by the electromagnetic wave heating method, and then reduce the water content to 3% by mass or less by the external heating method. The dielectric heating/drying is preferable as the electromagnetic heating method, and hot air drying is preferable as the external heating method. The drying temperature may preferably be from 50 to 120° C.

The honeycomb dried body is prepared as the "honeycomb structure element 20" before forming the slit(s), and the slit(s) is/are formed on the honeycomb structure element 20. It should be noted that the slit(s) does/do not have to be formed on the honeycomb dried body, and as described below, after the honeycomb dried body is fired to produce the honeycomb fired body, the honeycomb fired body may be prepared as the "honeycomb structure element 20" and the slit(s) may be formed on the honeycomb structure element 20. Preferably, the honeycomb fired body is used as the "honeycomb structure element 20" and the slit(s) is/are formed on the honeycomb structure element 20. The shape, number of slits, number of intersections, length, and width of the slit(s) can be designed as needed depending on the desired characteristics of the honeycomb structure to be produced, and the like.

(Firing Step)

The resulting honeycomb dried body is then fired to produce a honeycomb fired body. As described above, the honeycomb dried body may or may not have the slit(s) formed. As the firing conditions, the honeycomb dried body is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

(Method for Forming Slit According to Embodiment 1)

The method for forming the at least one slit in the honeycomb structure element 20 according to Embodiment 1 is carried out by placing (inserting) a wire into the cells of the prepared honeycomb structure element so as to pass from one end face to the other end face, and cutting the partition walls while moving the honeycomb structure element before forming the slit and/or the wire to form the slit. According to this configuration, the targeted partition walls can be accurately removed without removing the partition walls that do not need to form the slit. Therefore, the slit can be formed with high accuracy. Further, the partition walls can be cut by moving the inserted wire relative to the partition walls, so that the number of slit forming steps required for slit formation can be reduced, and the slit can be efficiently formed in a short period of time. The material and size (a wire diameter) of the wire used is not limited as long as the wire can cut the partition walls of the ceramic honeycomb structure element 20. Examples of the wire that can well cut the partition walls of the ceramic honeycomb structure element 20 include a wire electrodeposited with diamond abrasive grains. The size (wire diameter) of the wire that can well cut the partition walls of the ceramic honeycomb structure element 20 is preferably from 300 to 500 μm.

Figure 4:
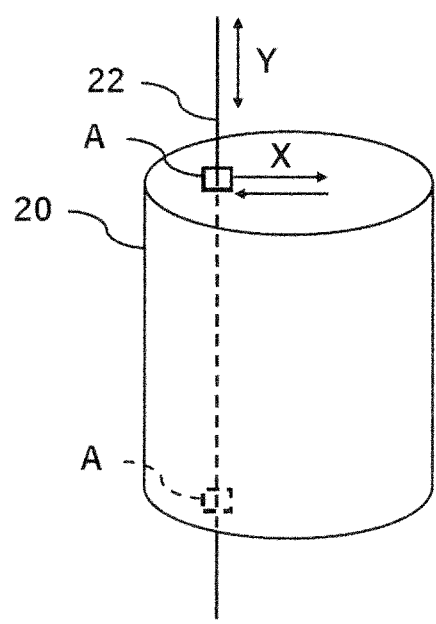
FIG. 4 is a schematic view for explaining a method of forming a slit with a wire.

As shown in FIG. 4, the method for forming the least one slit using a wire 22 may be carried out by inserting the wire 22 into a cell A from one end face to the other end face, and moving the wire inserted into the honeycomb structure element 20 or the cell in a direction perpendicular to the axial direction (X direction) while reciprocating the wire 22 or feeding the wire 22 in one direction along the axial direction (Y direction) of the honeycomb structure element 20 while rotating the wire 22 itself, thereby cutting the partition walls to form the slit. The rotating speed and the moving speed of the wire are not particularly limited and can be adjusted according to a desired cutting efficiency. For example, the rotating speed may be from 10 to 100 revolutions per a second, and the moving speed may be from 1 to 5 mm per a second. When forming a plurality of slits, the wire 22 inserted in the cell A is moved relative to the honeycomb structure element 20 in one direction to form a first slit, and then pulled out of the cell once, inserted again into the other cell at a predetermined position on the honeycomb structure element 20, and moved in one direction relative to the honeycomb structure element 20 in the same way to form a second slit. This process may be repeated to form the plurality of slits. Also, a plurality of wires 22 may be arranged in a plurality of cells and moved relative to the honeycomb structure element 20 in one direction to form a plurality of slits. In the case of forming slits in which a plurality of slits intersects on the end face of the honeycomb structure, in addition to the method for forming the slit as described above, the wire 22 inserted into the cell A can be moved relative to the honeycomb structure element 20 in one direction to form a first slit, and without pulling out the wire 22, moved through the slit as it is to form a second slit from a predetermined position so that they intersect with each other. This process may be repeated to form slits in the form where a plurality of slits intersects on the end face of the honeycomb structure.

Figure 5A:
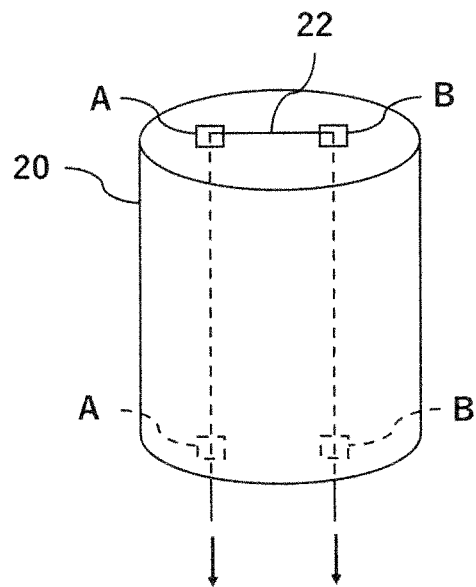
FIG. 5(A) and FIG. 5(B) are schematic views each explaining a method of forming a slit by a wire.
Figure 5B:
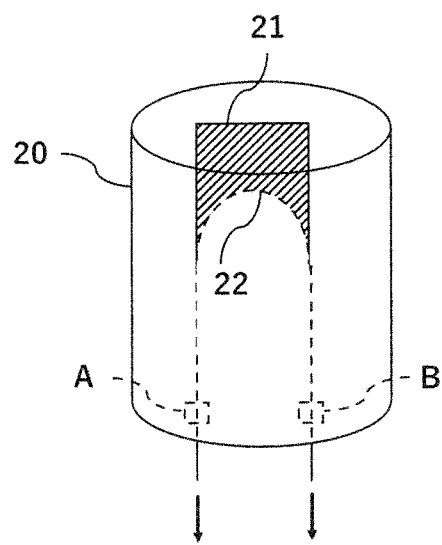

As shown in FIG. 5(A), the method for forming the least one slit using the wire 22 may be carried out by arranging the wire 22 so that it passes from one end face to the other end face in a cell A, from the cell A on the other end face to a cell B on the other end face, and from the other end face to one end face in the cell B, and simultaneously pulling end portions of the wire extending from the one end face side of the cell A and the cell B (pulling the wire downward in FIG. 5(A)) to cut the partition walls and form the slit. Alternatively, from the state shown in FIG. 5(A), the honeycomb structure element 20 may be moved in a direction from one end face to the other end face to cut the partition walls. This can gradually form the slit 21 from the other end face to the one end face of the honeycomb structure element 20, as shown in FIG. 5(B). When forming a plurality of slits, as described above, a slit may be formed by simultaneously pulling the end portions of the wire extending from one end face side of the cell A and the cell B, or moving the honeycomb structure element 20 in the direction from one end face to the other end face, and subsequently, another slit may be formed by determining two predetermined cells again in the same manner, passing a wire from one cell to the other cell, and then simultaneously pulling end portions of the wire extending from the end face side, or moving the honeycomb structure element 20 in the direction from one end face to the other end face. This process may be repeated to form a plurality of slits on the end faces of the honeycomb structure.

(Method for Forming Slit According to Embodiment 2)

The method for forming at least one slit in the honeycomb structure element 20 according to Embodiment 2 is carried out by applying ultrasonic vibration to a cutting tool 23 to cut the partition walls from one end face to the other end face of the prepared honeycomb structure element 20 before slit formation to form the slit. According to this configuration, the targeted partition walls can be removed with high accuracy without removing the necessary partition walls. Therefore, the slit can be formed with high accuracy. Further, the partition walls can be cut by applying ultrasonic vibration to the cutting tool 23 to cut the partition walls from one end face to the other end face of the honeycomb structure element 20 prior to slit formation, so that the number of slit forming steps required for slit formation can be reduced and the slit can be efficiently formed in a short period of time. It is preferable to perform the ultrasonic vibration under conditions of a frequency of 20 to 40 kHz and an output of 30 to 1000 W. Such conditions of ultrasonic vibration can allow for better cutting of the partition walls of the honeycomb structure element 20 made of ceramics. The frequency of the ultrasonic vibration is more preferably 22 to 27 kHz, and the output power is more preferably 50 to 100 W. The cutting tool 23 is not particularly limited as long as it can allow for better cutting of the partition walls of the ceramic honeycomb structure element 20. Examples of the cutting tool 23 include a tool in which a base metal of a carbon tool steel material (SK material) is electrodeposited with diamond abrasive grains.

Figure 6:
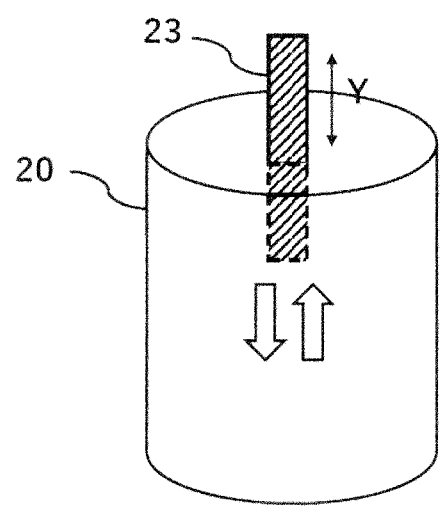
FIG. 6 is a schematic view explaining a method of forming a slit with a cutting tool.

As shown in FIG. 6, the method for forming the slit by applying the ultrasonic vibration to the cutting tool 23 may be carried out by moving the cutting tool 23 or the honeycomb structure element 20 so that the cutting tool 23 advances from one end face of the honeycomb structure element 20 in a direction parallel to the axial direction to cut the partition walls to form the slit. When forming a plurality of slits, one slit may be formed as described above, and the other slit may be then formed by moving the cutting tool 23 or the honeycomb structure element 20 again in the same manner so that the cutting tool 23 advances from one end face of the honeycomb structure element 20 in the direction parallel to the axial direction to cut the partition walls. This process may be repeated to form the plurality of slits on the end face of the honeycomb structure. In addition, depending on the size of the slit, it may be insufficient to form one slit only by moving the cutting tool 23 or the honeycomb structure element 20 so that the cutting tool 23 advances from one end face of the honeycomb structure element 20 in the direction parallel to the axial direction to cut the partition walls. In such a case, the size of the slit may be widened by performing a plurality of cutting processes with the cutting tool 23 described above to form a slit having a desired size.

Figure 7A:
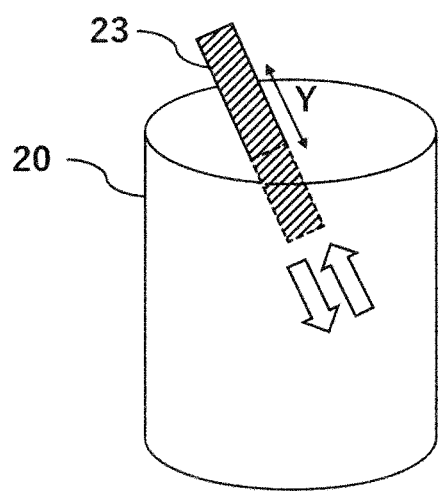
FIG. 7(A) and FIG. 7(B) are schematic views each explaining a method of forming a slit with a cutting tool.
Figure 7B:
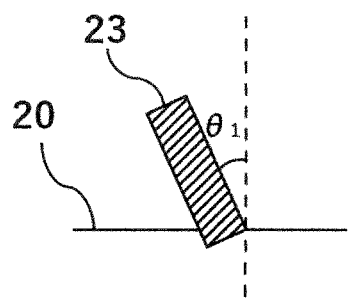

As shown in FIG. 7(A), the method for forming the at least one slit by applying the ultrasonic vibrations to the cutting tool 23 may be carried out by moving the cutting tool 23 or the honeycomb structure element 20 so that the cutting tool 23 advances from one end face of the honeycomb structure element 20 in a direction intersecting with the axial direction to cut the partition walls to form the slit. Further, in this case, the step as described above may be carried out multiple times to form the slits parallel to the axial direction from one end face to the other end face of the honeycomb structure element 20. According to such a configuration, ultrasonic cutting can be carried out in an oblique direction to the end face of the honeycomb structure element 20, thereby reducing cutting resistance and improving a cutting efficiency. As shown in FIG. 7(B), an angle θ1 at which the cutting tool 23 intersects with the axial direction from one end face of the honeycomb structure element 20 is not particularly limited and can be adjusted depending on the sizes and materials of the cutting tool 23 and the honeycomb structure element 20, the desired size of the slit, and the like. It may be from 15 to 45°, or from 20 to 40°.

Figure 8A:
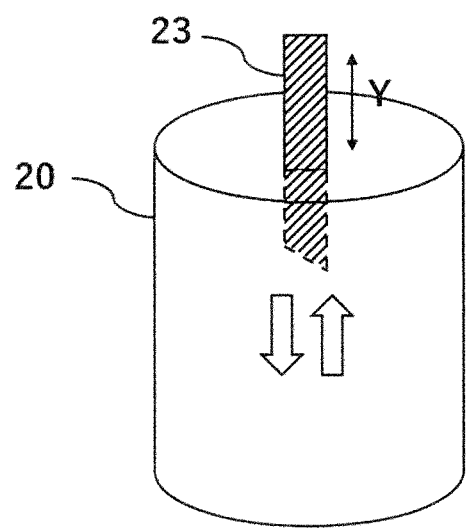
FIG. 8(A) and FIG. 8(B) are schematic views each explaining a method of forming a slit with a cutting tool.
Figure 8B:
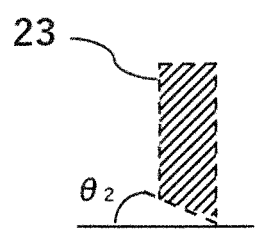

As shown in FIG. 8(A), the cutting tool 23 may have an inclined cross section at the tip of the cutting tool 23 shown in FIG. 6 in a direction parallel to the cutting direction. According to such a configuration, ultrasonic cutting can be carried out in an oblique direction to the end face of the honeycomb structure element 20, thereby reducing cutting resistance and improving a cutting efficiency. Further, even though the cutting tool 23 is moved parallel to the axial direction of the honeycomb structure element 20, the cutting resistance can be reduced. Therefore, it is not necessary to move the cutting tool 23 to advance in the direction intersecting with the axial direction of the honeycomb structure element 20 as shown in FIG. 7(A), which will simplify the production equipment to result in easy production. As shown in FIG. 8(B), an inclined angle θ2 of the cross section of the cutting tool 23 in the direction parallel to the cutting direction is not particularly limited and may be adjusted as appropriate depending on the sizes and materials of the cutting tool 23 and the honeycomb structure element 20, the desired size of the slit, and the like. It may be from 15 to 45°.

The honeycomb fired body with the at least one slit formed may be filled with a filling material. The filling material is filled by injecting it into the formed slit. For example, the slit can be filled by pressure injection using a syringe or other jig.

The honeycomb fired body filled with the filling material is heated to produce a honeycomb structure including the slit filled with the filling material. The heating may preferably be carried out at 400 to 700° C. for 10 to 60 minutes. The heating (heat treatment) is carried out in order to strengthen a chemical bonding of the filling material. The heating method is not limited, and the firing may be carried out using an electric furnace, gas furnace, or the like.

Further, the honeycomb fired body having the formed slit may be used as a honeycomb structure as it is. The method for producing the honeycomb structure with electrode portions is carried out by, first, applying the electrode portion forming raw material containing ceramic raw materials to the side surface of the honeycomb dried body and drying it to form a pair of unfired electrode portions on the outer surface of the outer peripheral wall, across the central axis of the honeycomb dried body, so as to extend in the form of strip in the flow direction of the cells, thereby producing a honeycomb dried body with unfired electrode portions. The honeycomb dried body with unfired electrode portions is then fired to produce a honeycomb fired body having a pair of electrode portions. The honeycomb structure with the electrode portions is thus obtained. In addition, the electrode portions may be formed after the honeycomb fired body is produced. Specifically, once the honeycomb fired body is produced, a pair of unfired electrode portions may be formed on the honeycomb fired body, and fired to produce the honeycomb fired body with the pair of electrode portions.

The electrode portion forming raw material can be formed by appropriately adding and kneading various additives to raw material powder (metal powder, and/or ceramic powder, and the like) formulated according to required characteristics of the electrode portions. When each electrode portion is formed as a laminated structure, the joining strength between each metal terminal and each electrode portion tends to be improved by increasing an average particle diameter of the metal powder in the paste for the second electrode portion, as compared with an average particle diameter of the metal powder in the paste for the first electrode portion. The average particle diameter of the metal powder refers to an arithmetic average diameter on volume basis when frequency distribution of the particle diameter is measured by the laser diffraction method.

The method for preparing the electrode portion forming raw material and the method for applying the electrode portion forming raw material to the honeycomb fired body can be performed according to a known method for producing a honeycomb structure. However, in order to achieve lower electrical resistivity of the electrode portions than that of the honeycomb structure portion, it is possible to increase a metal content ratio or to decrease the particle diameter of the metal particles as compared with the honeycomb structure portion.

Before firing the honeycomb dried body with unfired electrode portions, degreasing may be carried out in order to remove the binder and the like. As the firing conditions for the honeycomb dried body with unfired electrode portions, the honeycomb dried body with unfired electrode portions is preferably heated in an inert atmosphere such as nitrogen and argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

<4. Method for Producing Electrically Heating Support>

In one embodiment of the method for an electrically heating support 30 according to the present invention, a metal electrode is fixed to each of the electrode portions on the honeycomb structure 10. Examples of the fixing method includes laser welding, thermal spraying, ultrasonic welding, and the like. More particularly, a pair of metal electrodes are provided on the surfaces of the electrode portions across the central axis of the honeycomb structure portion of the honeycomb structure 10. The electrically heating support 30 according to an embodiment of the present invention is thus obtained.

(5. Exhaust Gas Purifying Device)

The electrically heating support 30 according to the above embodiment of the present invention as described above can be used for an exhaust gas purifying device. The exhaust gas purifying device includes the electrically heating support 30 and a metallic cylindrical member for holding the electrically heating support 30. In the exhaust gas purifying device, the electrically heating support 30 can be installed in an exhaust gas flow path for allowing an exhaust gas from an engine to flow.

EXAMPLES

Hereinafter, Examples is illustrated for better understanding of the present invention and its advantages, but the present invention is not limited to these Examples.

Example 1

A honeycomb fired body (honeycomb structure element before slit formation) with circular end faces each having a diameter of 100 mm, a height (length in the flow direction of the cells) of 100 mm, a cell density of 93 cells/cm$^2$, a thickness of each partition wall of 101.6 μm, a porosity of the partition walls of 45%, and a hexagonal cell shape was prepared.

A wire was inserted into the cell of the honeycomb fired body from one end face to the other end face, and one straight slit was formed by cutting the partition walls while moving the wire while rotating the wire itself. Specifically, a group of hexagonal cells lined up in a row was defined on the end face of the honeycomb fired body, and one straight slit was formed by cutting the partition walls that intersected with the straight line formed by the group of the cells. The wire used was a wire electrodeposited with diamond abrasive grains, and the wire diameter was 400 μm including the abrasive grain part. The rotating speed of the wire was 50/sec and the moving speed was 2 mm/sec. The length of the slit to be processed was 70 mm (63 cells), and the width was 1 cell. The time required for processing the slit was 30 seconds.

Example 2

A sample was prepared in the same method as that of Example 1, with the exception that the slit was machined with an ultrasonic tool. The time required for processing the slit was 30 seconds.

Comparative Example 1

A sample was prepared in the same method as that of Example 1, with the except that the slit was processed with a file. The time required for processing the slit was 10 minutes.

(Evaluation of Processing Accuracy)

Images obtained by observing the slit shapes of the end faces of the honeycomb structures according to Examples 1 and 2 and Comparative Example 1 under a microscope were visually evaluated.

Here, as described above, all Examples 1 and 2 and Comparative Example 1 attempted to define a group of hexagonal cells arranged in a row on the end face of each honeycomb structure, and cut the partition walls intersecting with the straight line formed by the group of the cells to form a single straight slit.

The evaluation of the above images indicated that in Examples 1 and 2, only the partition walls intersecting with the straight line formed by the group of the cells were cut and removed, and the slit could be formed with good processing accuracy.

On the other hand, in Comparative Example 1, a part of the partition wall on the side surface, which was to surround the straight slit, might also be cut, when cutting the partition walls intersecting with the straight line formed by the group of the cells, regardless of the longer time required for processing the slit than that of each of Examples 1 and 2, and the processing accuracy was inferior to that of each of Examples 1 and 2.

DESCRIPTION OF REFERENCE NUMERALS 10 honeycomb structure
11 honeycomb structure portion
12 outer peripheral wall
13a, 13b electrode portion
18 cell
19 partition wall
20 honeycomb structure element
21 slit
22 wire
23 cutting tool
30 electrically heating support
33a, 33b metal electrode
A, B cell

The invention claimed is:

1. A method for producing a ceramic honeycomb structure, the honeycomb structure comprising: an outer peripheral wall; and partition walls disposed on an inner side of the outer peripheral wall, the partition walls defining a plurality of cells, each of the cells extending from one end face to another end face to form a flow path, wherein the honeycomb structure comprises at least one slit provided on a cross section perpendicular to an axial direction of the honeycomb structure,
wherein the method comprises the steps of:
preparing a honeycomb structure element before forming the slit; and
forming the slit by arranging a wire so as to pass from the one end face to the other end face in a cell A of the plurality of cells, from the cell A on the other end face to a cell B of the plurality of cells on the other end face, and from the other end face to the one end face in the cell B; and
simultaneously pulling end portions of the wire extending from the one end face side of each of the cell A and the cell B, and/or moving the honeycomb structure element in a direction from the one end face to the other end face, to cut the partition walls.

2. The method for producing the honeycomb structure according to claim 1, wherein the step of forming the slit is carried out after producing a honeycomb dried body or after producing a honeycomb fired body.

3. The method for producing the honeycomb structure according to claim 1, wherein the honeycomb structure has a plurality of slits.

4. The method for producing the honeycomb structure according to claim 3, wherein the plurality of slits are slits that intersect with one another in the cross section of the honeycomb structure and/or are divided along an extending direction of the slits in the cross section of the honeycomb structure.

5. The method for producing the honeycomb structure according to claim 1, further comprising a step of forming a pair of electrode portions on an outer surface of the outer peripheral wall so as to extend in a band shape in a flow path direction of the plurality of cells across a central axis of the honeycomb structure.

6. A method for producing an electrically heating support, the method comprising a step of electrically connecting a metal electrode to each of the pair of electrode portions of the honeycomb structure produced by the method according to claim 5.

* * * * *